R. E. FULLER.
DUSTPROOFING AND COOLING TRACTOR CABS.
APPLICATION FILED APR. 22, 1919.

1,416,813. Patented May 23, 1922.

Witness
Inventor
Ralph E. Fuller
Attorney

UNITED STATES PATENT OFFICE.

RALPH E. FULLER, OF WASHINGTON, DISTRICT OF COLUMBIA.

DUSTPROOFING AND COOLING TRACTOR CABS.

1,416,813.  Specification of Letters Patent.  Patented May 23, 1922.

Application filed April 22, 1919. Serial No. 291,846.

*To all whom it may concern:*

Be it known that I, RALPH E. FULLER, a citizen of the United States, residing at Washington, District of Columbia, have invented certain new and useful Improvements in Dustproofing and Cooling Tractor Cabs, of which the following is a specification.

This invention relates to improved means for cooling and ventilating the interior of an enclosure containing an internal combustion engine, and relates more particularly to the feeding of a current of air, which has been freed from all dust to the cabs of gasoline tractors in which both the motor and operator are enclosed.

Figure 1:
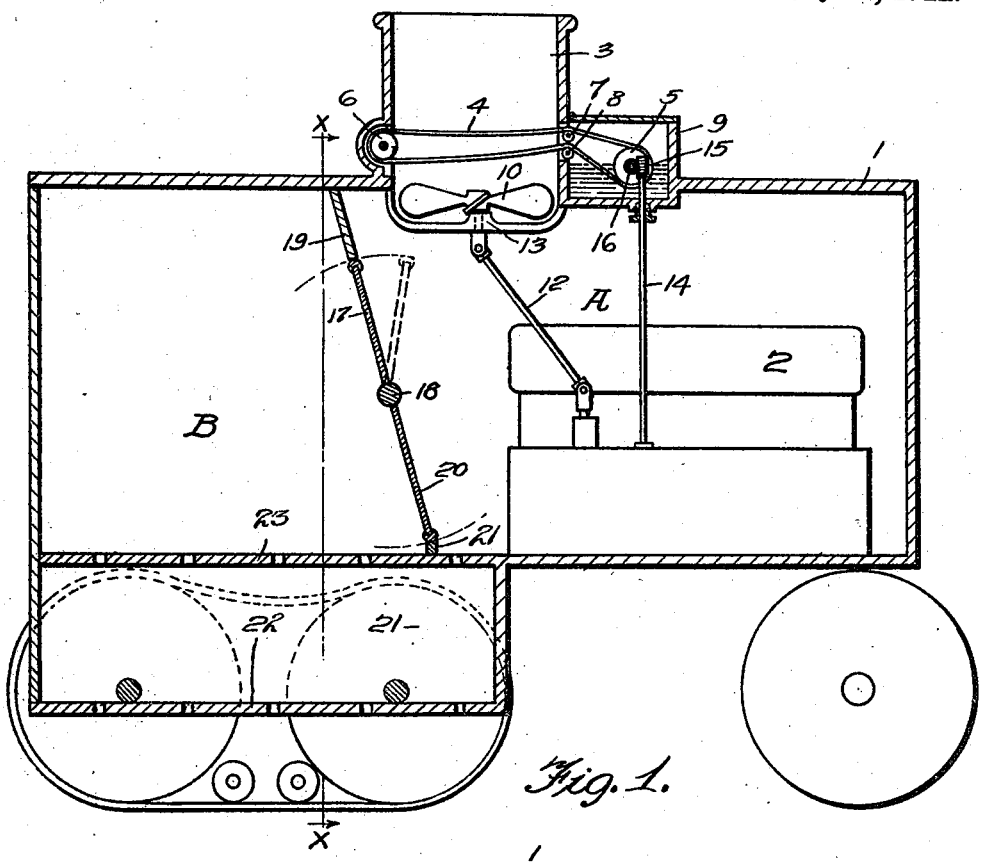

In the accompanying drawings which constitute a part of this specification Figure 1 is a vertical, longitudinal section of a tractor showing my improved means of ventilating the cab and cooling the motor as applied thereto.

Figure 2:
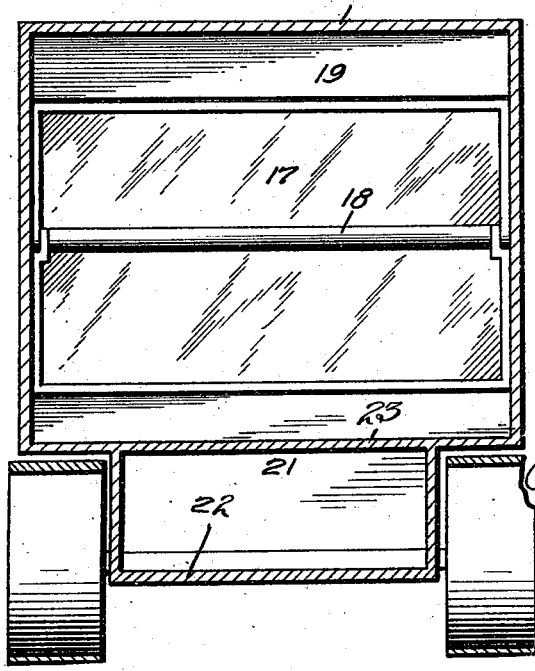

Figure 2 is a vertical, transverse section taken on line X—X Figure 1 looking in the direction of the arrow.

Referring more specifically to the drawings, reference numeral 1 indicates a tractor cab which is sub-divided into compartments A and B and which is provided with a door of any suitable construction for ingress and egress, not shown and which may be used for ventilating purposes; 2 is a gas engine; 3 is a rectangular stack which is of sufficient height to extend above the dust level; 4 is an air screen which is preferably made of a loose mesh fabric, and is in the form of a belt and is adapted to travel around drum 5 and idler 6, and is supported intermediate its ends by idlers 7 and 8, and is driven by drum 5; 9 is a tank which may be partially filled with water, oil or other liquid, through which belt 4 passes and becomes saturated therewith, and is for the purpose of arresting any dust that may be drawn into stack 3 with the intake of air into the cab by the action of rotary fan 10, which fan is driven by the motor 2 in any suitable manner, though for the purpose of illustration I have shown the fan as driven by shaft 12, which is connected to fan 10 through the means of a universal joint at the lower extension 13 of the fan 10. Drum 5 is also driven by the motor 2, and may be operably related thereto in any suitable manner, though for the purpose of illustration I have shown it as driven through the medium of shaft 14, which carries at its upper end a worm 15, which meshes with gear 16 of the drum; 17 is a glass partition carried transversely of the cab and is pivotedly mounted on bar 18, which bar is supported by suitable bearings at its opposite ends on the sides of the cab; the partition 17 is of sufficient height to bring its upper edge in contact with dependent apron 19 when tilted rearwardly; 20 is a glass partition dependent from bar 18 and pivotedly related thereto, and is of such width as to provide clearance only over the top of sill 21 when the partition 20 is swung forwardly or rearwardly; 22 indicates the bottom of the cab and 23 indicates the floor thereof, a portion of both of which is in the form of a grid the floor 23 being spaced from bottom 22, through which space the axles of the tractor pass.

Having thus described my invention what I claim is:

1. In an inclosure subdivided into a plurality of compartments, means for forcing a current of air thereinto, means for directing said current of air upwardly or downwardly from one of said compartments into another of said compartments.

2. In a cab, compartments therein and a stack carried thereby, a travelling screen lying transversely of said stack, means for drawing a current of air into said cab and through said screen, means for deflecting said current of air through one of said compartments into another of said compartments.

3. In a cab, subdivided into compartments, a stack carried by said cab, a liquid reservoir carried by said stack, a travelling screen lying transversely of said stack and through said reservoir, means for drawing a current of air through said stack and said screen and delivering a portion of said current of air into one of said compartments and the balance into another of said compartments.

4. In a cab, subdivided into compartments, a stack carried by said cab, means for drawing a current of air into said cab through said stack and adjustable means lying in the path of said current of air for directing said current of air into one of said compartments to the exclusion of other of said compartments.

5. In a cab, compartments therein and a stack carried thereby, a traveling screen lying transversely of said stack, means for drawing a current of air into said cab and through said screen, means for deflecting said current of air into one of said compartments in exclusion of the other of said compartments.

In testimony whereof I affix my signature.
RALPH E. FULLER.